H. SCHLICHT.
WHEEL.
APPLICATION FILED MAR. 17, 1913.
1,094,752.
Patented Apr. 28, 1914.
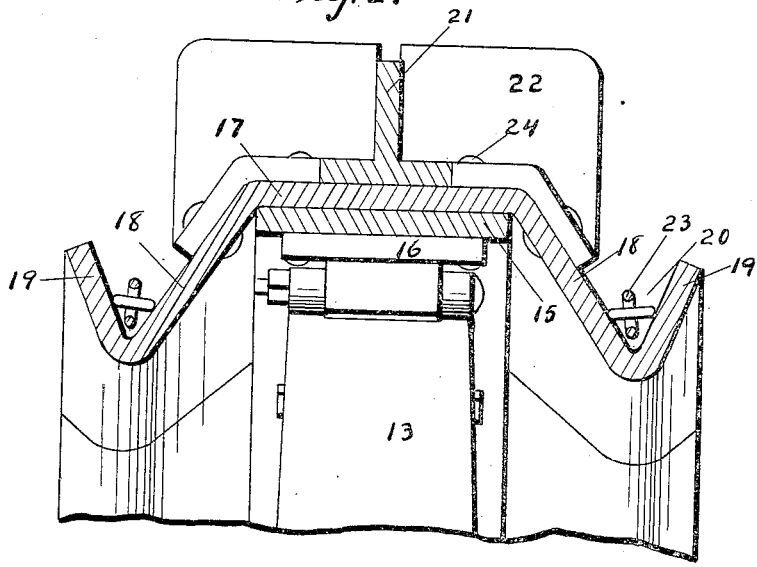
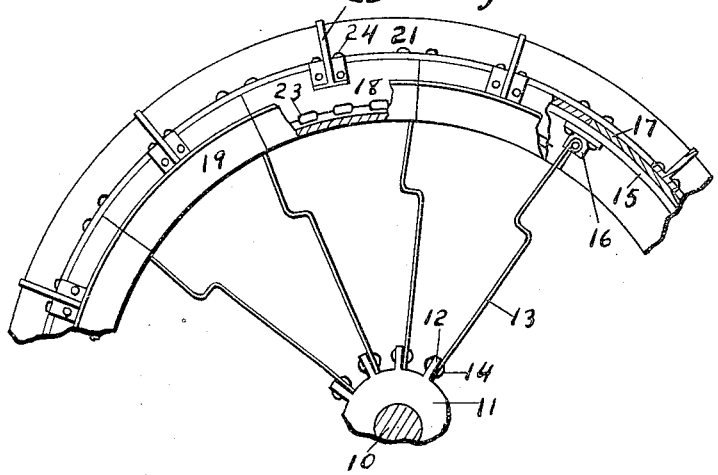
WITNESSES:
L. C. Paley
A. H. Hague
INVENTOR.
Hans Schlicht
BY
Orwig & Bair
ATTORNEYS.

UNITED STATES PATENT OFFICE.

HANS SCHLICHT, OF WALNUT, IOWA.

WHEEL.

1,094,752.

Specification of Letters Patent. Patented Apr. 28, 1914.

Application filed March 17, 1913. Serial No. 755,024.

*To all whom it may concern:*

Be it known that I, HANS SCHLICHT, a citizen of the United States, and resident of Walnut, in the county of Pottawattamie and State of Iowa, have invented a certain new and useful Wheel, of which the following is a specification.

The object of my invention is to provide a wheel especially designed for traction engines and the like, which wheel is of simple and durable construction.

A further object is to provide a wheel of the class mentioned of comparatively narrow width with the parts of its rim so constructed and arranged as to afford a maximum of surface for gripping the ground.

A further object is to provide such a wheel in which the parts of the rim are made in sections so that they may be easily and readily taken apart and repaired or replaced.

A further object is to provide such a wheel having spring spokes, the rim portion of said wheel being so constructed and arranged as to afford a maximum of protection to the outer ends of the spokes.

My invention consists in certain details, in the construction, combination and arrangement of the various parts of the device whereby the objects contemplated are attained, as hereinafter more fully set forth, pointed out in my claims and illustrated in the accompanying drawings, in which—

Figure 1 shows a side elevation of a part of the wheel embodying my invention with portions cut away, and Fig. 2 shows a transverse, sectional view through the rim of said wheel.

In the accompanying drawings, I have used the reference numeral 10 to indicate generally the axle of a traction engine or the like on which is mounted a hub 11 of my wheel. On the outer surface of the hub 11 are a plurality of radially extending lugs 12 to which are secured flat spring spokes 13 by means of bolts 14. I provide a flat rim 15 having on its end surface a plurality of detachable lugs 16 to which the outer ends of the spokes 13 are pivoted. On the outside of the rim 15 is a circular plate 17, on each side of which are flanges which extend laterally and inwardly, as clearly shown in Fig. 2. At the inner edges of the flanges 18 are flanges 19 which extend outwardly and laterally. It will thus be seen that between the flanges 19 and 18 is a channel 20.

Secured to the outer surface of the plate or outer rim 17, which forms with its flanges the tread portion of the rim, is a T iron 21 extending entirely around the rim of the wheel. Arranged at regular intervals on the outside of the rim of the wheel are plates or lugs 22 designed to engage the ground at right angles thereto. The lugs 22 are firmly secured to the T iron 21, the plate 17 and the flange 18. Said lugs are arranged in pairs opposite each other on opposite sides of the stem portion of the T iron 21. In the channels 20 I have loosely mounted linked chains 23.

My improved wheel is particularly designed for use with traction engines and it is my purpose to secure a maximum of gripping surface for frictionally engaging the earth or other surface on which the wheel travels in a wheel having a comparatively narrow rim or tread. On account of the construction of the plate 17 and flanges 18 and 19, I secure a maximum of surface for engaging the ground in a comparatively narrow wheel. The lugs 22 furnish means for gripping the earth at the point where the wheel sinks deepest.

It will readily be seen that the lugs 22 may be removed with comparative ease if it is necessary to replace or repair them. By removing said lugs the T iron 21 may be removed. The channels 20 are kept clean by means of the loose chains 23.

On account of the construction of the flanges 18 and 19 my pivoted outer ends of the spokes 13 are protected from dirt and the like. The rim or plate 17 is made in sections, as shown in Figs. 1 and 2 and the lugs 22, plate 17, rim 15 and lugs 16 are all secured together by means of bolts 24. By means of the chains 23 dirt or the like which may accumulate in the channels 20 will be quickly broken up and will then be removed from said channels by gravity.

I claim as my invention:

1. In a device of the class described a hub, a plurality of radially extending spokes, a flat rim to the under surface of which said spokes are pivotally secured, a flat casing inclosing said rim and provided on each side with laterally and inwardly extending flanges and with flanges extending outwardly and laterally from said first flanges.

2. In a device of the class described, a hub, spokes extending radially therefrom, a flat rim to which said spokes are secured, a casing made in sections each comprising a tread portion surrounding said rim provided on each side with inwardly and laterally extending flanges on which are formed outwardly and laterally extending flanges, and means for securing said sections to said rim.

3. In a device of the class described, a hub, spokes extending radially therefrom, a flat rim to which said spokes are secured, a flat casing surrounding said rim and provided on each side with inwardly and laterally extending flanges on which are formed outwardly and laterally extending flanges, and a T iron extending circumferentially around said casing with the stem flange extending outwardly and means for securing said rim, said casing and said T iron together.

4. In a device of the class described, a hub, spokes extending radially therefrom, a flat rim to which said spokes are secured, a flat casing surrounding said rim and provided on each side with inwardly and laterally extending flanges on which are formed outwardly and laterally extending flanges, a T iron extending circumferentially around said casing with the stem flange extending outwardly and a plurality of radially extending lugs arranged in pairs on each side of said T iron, and means for securing said lugs, said T iron, said casing and said rim together.

5. In a device of the class described, a hub, spokes extending radially therefrom, a flat rim to which said spokes are secured, a flat casing surrounding said rim and provided on each side with inwardly and laterally extending flanges on which are formed outwardly and laterally extending flanges, a T iron extending circumferentially around said casing with the stem flange extending outwardly and a plurality of radially extending lugs arranged in pairs on each side of said T iron, said pairs being arranged at intervals on said wheel, means for securing said lugs, said T iron, said casing and said rim together and a chain in each channel formed between the adjacent flanges of said casing.

Des Moines, Ia., March 8, 1913.

HANS SCHLICHT.

Witnesses:
S. ROBINSON,
M. WALLACE.

---

Copies of this patent may be obtained for five cents each, by addressing the "Commissioner of Patents, Washington, D. C."